Patented May 13, 1924.

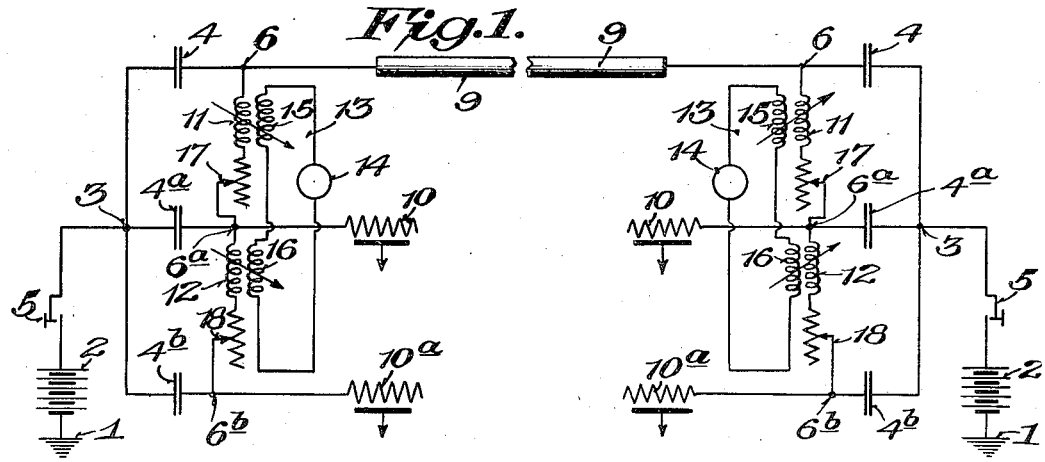
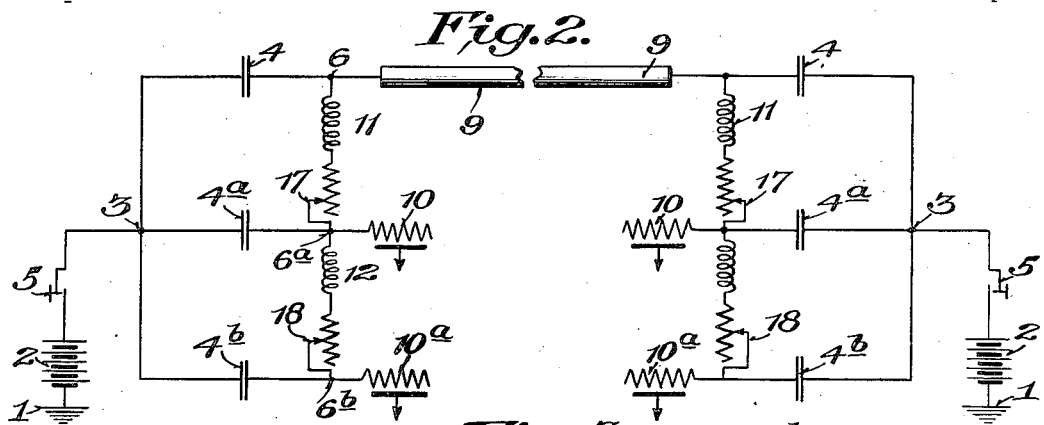
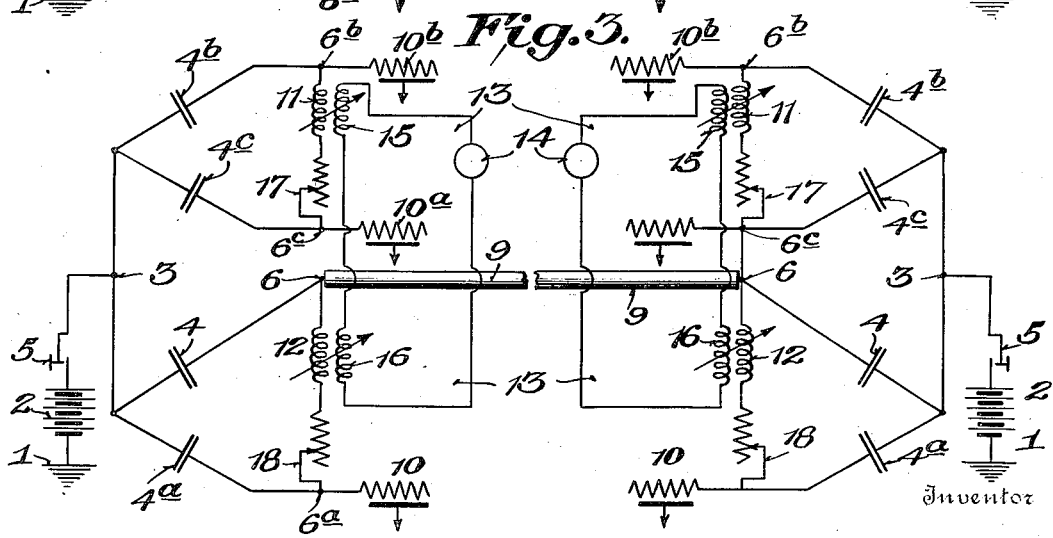

1,493,807

UNITED STATES PATENT OFFICE.

LOUIS COHEN, OF WASHINGTON, DISTRICT OF COLUMBIA.

CABLE SIGNALING.

Application filed March 3, 1919. Serial No. 280,419.

*To all whom it may concern:*

Be it known that I, LOUIS COHEN, a citizen of the United States, and a resident of Washington, in the District of Columbia, have invented certain new and useful Improvements in Cable Signaling, of which the following is a specification.

This invention relates to improvements in the art of cable signaling.

In the ordinary method or present practice of duplexing, a Wheatstone bridge arrangement is used, two sending-end condensers, the cable, and an artificial cable constituting the four arms of the bridge, and the detecting instrument bridged across between the cable and the artificial cable constituting the bridging arm thereof. If a perfect balance can be maintained between the cable and the artificial cable, equivalent currents will flow from the sending-end battery into the cable and its artificial equivalent, the fluctuations of potential at the ends of the indicating instrument, which is the bridging arm, will be simultaneous and equal, no portion of the sending current will pass through the receiving instrument, and the latter is left subject only to the current of received signals.

In practice, however, a complete balance between cable and artificial cable is seldom realized, the principal difficulty residing in the construction and maintenance of the artificial cable, and therefore, in duplex working the sensitive receiving instrument is subjected to shocks, and it becomes necessary, in order to secure definition of signals, that the current of the incoming signal should be comparable in magnitude with the disturbing current of the local transmitter, as otherwise, the effect due to the current of incoming signal would be completely masked. To secure this magnitude of incoming current, the duration of a signaling impulse must be prolonged until the current arriving at the receiving end is built up to such magnitude, and this in turn results in the speed of signaling being, to that extent, reduced.

From the foregoing it will be seen that the speed of signaling is, to a large extent, controlled by the accuracy with which the balance at the two ends of the duplex bridge may be maintained.

In the present invention, the principal object is to improve the balancing of the duplex bridge in its effect upon the receiving indicating device. This is accomplished by affecting the detector by a counter current flow of same intensity and character as that which may be developed because of any lack of perfect balance between any arms of the bridge. While this balancing current may be taken from any suitable local source, it is preferably derived from the sending current itself, through the medium of additional circuits, such, for instance, as may be provided by a second bridge arrangement, the current in the bridging arm of which is in position to oppose the current in the bridge arm of the first bridge arrangement; suitable impedance adjustments being included in order that the two bridging arm currents may be made substantially equal.

In the accompanying drawings, Figures 1, 2, and 3 illustrate, schematically, three embodiments of the invention by way of illustration.

In said Figures 1 and 2, 1 represents a ground connection, and 2 is a source of electromotive force. The latter is shown diagrammatically as a battery, but it may just as well be, for the purpose of this invention, any other source of electromotive force, either direct or alternating, such, for instance, as a dynamo or an alternator. Source 2 is connected through a sending key 5, to a junction point 3. The key 5 is here shown as ordinary make and break key. Any other method, however, of sending, could be used, for instance, the reversal method. From the junction point 3 the current divides into three branches. Condenser 4 and cable 9 constitute one branch; condenser $4^a$ and artificial cable 10 constitute a second branch; and condenser $4^b$ and artificial cable $10^a$ constitute the third branch. In this arrangement we have a double Wheatstone bridge, or a second bridge arrangement in addition to the normal or first bridge arrangement. Condensers 4 and $4^a$, cable 9 and artificial cable 10 constitute the four arms of one Wheatstone bridge arrangement, the element 11 being the bridging arm thereof. Condensers $4^a$ and $4^b$, artificial cables 10 and $10^a$ constitute the second Wheatstone bridge arrangement, and 12 is the bridging arm thereof. Now, suppose that in the first bridge arrangement, which consists of 4, 9, $4^a$ and 10, there is a lack of balance of such character that the potential of point 6 is slightly higher than that of point $6^a$; the result will be that a current will flow from 6 to $6^a$ through the element 11. But if we adjust the second bridge arrangement, which consists of $4^a$, $4^b$, 10 and $10^a$, so as to make $6^b$ of a slightly higher potential than that of $6^a$, we shall have a current flow in element 12 from $6^b$ to $6^a$. This can be accomplished by the proper adjustment of either condenser $4^b$ or artificial cable $10^a$. To equalize the current intensities in the branches 11 and 12, variable resistances 17 and 18 are inserted in series in these two branches, thereby enabling the adjustment of the current strengths to be exactly equalized. We have then the condition that currents derived from the local source, and, due to lack of perfect balance, flow in opposite directions in elements 11 and 12, and are of the same intensity. If now we couple to these two elements 11 and 12 a common circuit 13, which contains the detector or indicating device 14, there will evidently be no current induced in it from the local source, and hence no effect on the indicating device. As a further means of securing a perfect balance or neutralization of currents from the local source, in their effect upon the indicating instrument 14, the couplings between 11 and 15, and 12 and 16, may be made variable and adjustable, thereby permitting a still higher degree of neutralization of disturbances from the local transmitter. Under these conditions, current from the incoming signals, from the other end of the cable, in reaching the point 6 divides into three parts, one part being shunted away through condenser 4 to ground, while the other two parts thereof flow, the one through elements 11 and $4^a$ to ground, and the other through elements 12 and $4^b$ to ground. In this disposal of received signal current it will be seen that such currents flow in the same direction in both the elements 11 and 12, and consequently their effects upon circuit 13, which includes the indicating device 14, are additive.

An important advantage of this method is that a larger portion of the current due to the incoming signal is being utilized to actuate the indicating device. In the methods as used at present, the current of incoming signals divides in two paths, one part flowing through a condenser to ground without exerting any effect upon the detecting instrument, so that less than half of the signal current is actually utilized to affect the indicating instrument. In the present method, the incoming current, in reaching the point 6, divides into three paths, one path being 6, 4, 3, 5, 2, 1, exerting no influence on the detecting instrument, while the currents flowing through the other two paths, 6, $6^a$, $4^a$, 3, 5, 2, 1, and 6, $6^a$, $6^b$, $4^b$, 3, 5, 2, 1, respectively, both exert an influence upon the indicating device, with the result that about two-thirds of the current of the incoming signal is being utilized to actuate the indicating device. Thus, it is evident that with the new arrangement described, we not only obtain a condition whereby a more perfect balance is obtained, but at the same time insure a greater portion of the current of the incoming signal being utilized for detecting purposes. Both of these conditions are very important and make it possible to use a more sensitive indicating device, and therefore admit of operating on a lower part of the arrival curve of current delivered at the receiving end, that is to say a smaller time duration of signaling impulses is required, and consequently, an increase in the speed of signaling is obtained, as before explained. Any suitable device suitable for the reception of weak signals may be used in this method. It may be a siphon recorder, an audion detector, or any other suitable device.

The arrangement of Figure 2 is similar to that of Figure 1, except that the coupled circuit 13 is eliminated. The bridge arms 11 and 12 may be in the form of coils which form part of the detecting device. The balancing is obtained in exactly the same way as described in connection with Figure 1. The currents from local source, due to lack of balance, flow in opposite directions in the coils 11 and 12, and thereby neutralizing their effects, while the current from the incoming signals flows in the same direction in both coils 11 and 12, and thereby produces an additive effect. The equalization of the current intensities in the two bridge arms 11 and 12 is obtained by varying either the number of turns of the coils 11 and 12, or varying resistances 17 and 18, introduced therein.

According to Figure 3, two entirely independent bridge arrangements may be used, condensers 4, $4^a$, cable 9 and artificial cable 10 constituting one bridge arrangement, and condensers $4^b$, $4^c$, and artificial cables $10^a$ and $10^b$ constituting the arms of a second bridge arrangement. The bridging arm element of these two bridge arrangements are, 12, 18, and 11, 17, respectively, of which 11 and 12 are the induction elements, and 17 and 18 are the variable resistance elements. The bridge $4^b$, $4^c$, $10^a$ and $10^b$ is adjusted so as to give a difference of potential between $6^b$ and $6^c$, of the same order of magnitude as that which may develop between 6 and $6^a$, as a result of imperfect balance in the bridge 4, $4^a$, 9, 10. The current intensities in the two bridge elements 11, 17, and 12, 18, are brought into equality by varying the resistance elements 17 and 18. The detector circuit 13 is coupled to the two bridging elements 11 and 12 in such a way that the E. M. F.'s induced in the detector circuit are in opposition and therefore produce no current flow in the detector circuit, and hence have no effect upon the detector 14. The current of the incoming signal, however, acts only on one bridging element, 12, 18, and consequently, through coupling 16, sets up a current flow in circuit 13 and actuates the detector 14.

Claims:

1. In an electrical interference neutralizing device, the combination of a transmission circuit, a second circuit simulating said first circuit, both of said circuits having one common conductor, means for impressing in opposite directions upon the same circuit the interference voltage waves set up in the respective circuits whereby said voltages will be neutralized.

2. In an electrical interference neutralizing device, the combination of a transmission circuit, a second circuit designed to simulate said transmission circuit, both of said circuits having a common conductor, and exposed to substantially the same interference, a duplex set individual to said transmission circuit and said second circuit, a plurality of balancing networks adapted to balance each of said circuits with respect to the ratio arms of the duplex sets and means for opposing the interference voltage waves set up in each of said circuits.

3. In a system of duplex signaling having two Wheatstone bridges, a cable constituting one arm of one of said Wheatstone bridges, means for impressing a common transmitting E. M. F. on the said Wheatstone bridges, means for controlling the direction and intensity of the currents which may result in the bridging elements of said Wheatstone bridges, due to imperfect balance in the bridges, and an indicating instrument connected electrically to the bridging elements of the said Wheatstone bridges.

4. In a system of duplex signaling having two Wheatstone bridges, a cable constituting one arm of one of said Wheatstone bridges, means for impressing a common transmitting E. M. F. on the said Wheatstone bridges, means for controlling the direction and intensity of the currents, which may result in the bridging elements of said Wheatstone bridges, due to imperfect balance in the bridges, and an indicating instrument connected in an independent circuit, said circuit being coupled electromagnetically to the bridging elements of the said Wheatstone bridges.

5. In a system of duplex signaling having two Wheatstone bridges, a cable constituting one arm of one of said Wheatstone bridges, means for impressing a common transmitting E. M. F. on the said Wheatstone bridges, means for controlling the direction and intensity of the currents which may result in the bridging elements of said Wheatstone bridges, due to lack of balance in the bridges, an indicating instrument connected in an independent circuit, said circuit being coupled electromagnetically to the bridging elements of the said Wheatstone bridges, and means for varying the degree of coupling of said indicating instrument circuit to the said bridging elements.

6. In a system of duplex signaling having two Wheatstone bridges, a cable constituting one arm of one of said Wheatstone bridges, means for impressing a common transmitting E. M. F. on the said Wheatstone bridges, means for balancing the said Wheatstone bridges, an indicating instrument electrically associated with the bridging elements of said Wheatstone bridges, and means for balancing against each other the effects on said indicating instrument of any residuary current flow which may result in said bridging elements due to imperfect balance.

LOUIS COHEN.